United States Patent
Chen et al.

(10) Patent No.: US 9,130,266 B2
(45) Date of Patent: Sep. 8, 2015

(54) HANDHELD COMMUNICATION DEVICE AND COMMUNICATION METHOD OF THE SAME

(71) Applicants: Chien-Chih Chen, Taoyuan (TW); Chun-Wei Tseng, Taoyuan (TW); Yen-Liang Kuo, Taoyuan (TW); Wan-Ming Chen, Taoyuan (TW)

(72) Inventors: Chien-Chih Chen, Taoyuan (TW); Chun-Wei Tseng, Taoyuan (TW); Yen-Liang Kuo, Taoyuan (TW); Wan-Ming Chen, Taoyuan (TW)

(73) Assignee: HTC CORPORATION, Taoyuan (TW)

(*) Notice: Subject to any disclaimer, the term of this patent is extended or adjusted under 35 U.S.C. 154(b) by 397 days.

(21) Appl. No.: 13/622,445

(22) Filed: Sep. 19, 2012

(65) Prior Publication Data

US 2014/0080548 A1    Mar. 20, 2014

(51) Int. Cl.
    *H04M 1/00*     (2006.01)
    *H01Q 1/24*     (2006.01)
    *H04M 1/725*    (2006.01)
    *H04M 1/60*     (2006.01)

(52) U.S. Cl.
    CPC ............. *H01Q 1/24* (2013.01); *H04M 1/72569* (2013.01); *H04M 1/605* (2013.01); *H04M 2250/12* (2013.01)

(58) Field of Classification Search
    CPC ....... H04W 88/06; H04W 76/02; H04W 8/18; H04W 8/26; H04W 4/16; H04W 80/04; H04W 84/042; H04W 16/14; H04W 36/0022; H04W 36/0066; H04W 36/18; H04W 88/14; H04W 8/08; H04W 92/02; H04W 12/08
    USPC ..................... 455/569.1, 569.2, 575.1–575.9, 455/90.1–90.3, 552.1–555, 41.2, 421
    See application file for complete search history.

(56) References Cited

U.S. PATENT DOCUMENTS 4,905,270 A * 2/1990 Ono ........................... 455/569.2
5,224,151 A * 6/1993 Bowen et al. ............... 455/569.1
(Continued)

FOREIGN PATENT DOCUMENTS

| CN | 101540621 A | 9/2009 |
| CN | 101860377 A | 10/2010 |
| CN | 102170305 A | 8/2011 |

OTHER PUBLICATIONS

China Office Action dated Feb. 17, 2015.
(Continued)

*Primary Examiner* — Sharad Rampuria
(74) *Attorney, Agent, or Firm* — McClure, Qualey & Rodack, LLP

(57) ABSTRACT

A communication method used in a handheld communication device is provided. The communication method comprises the steps outlined below. Whether a voice communication is established is determined. When the voice communication is established, a sensing element is activated to determine whether the handheld communication device is operated in a hand mode. When the handheld communication device is not operated in the hand mode, an antenna module of the handheld communication device would be operated in a first operation frequency band to perform the voice communication. When the handheld communication device is operated in the hand mode, the antenna module of the handheld communication device would be operated in a second operation frequency band to perform the voice communication, in which the second operation frequency band is higher than the first operation frequency band. A handheld communication device is disclosed herein as well.

14 Claims, 3 Drawing Sheets

(56) References Cited

U.S. PATENT DOCUMENTS

| | | | |
|---|---|---|---|
| 5,379,338 A * | 1/1995 | Umemoto et al. | 455/570 |
| 6,002,949 A * | 12/1999 | Hawker et al. | 455/569.1 |
| 7,526,313 B2 * | 4/2009 | Mousseau et al. | 455/552.1 |
| 8,774,397 B2 * | 7/2014 | Ito et al. | 379/390.03 |
| 2004/0043796 A1 * | 3/2004 | Aubauer et al. | 455/569.1 |
| 2007/0015535 A1 * | 1/2007 | LaBauve et al. | 455/552.1 |
| 2007/0218958 A1 * | 9/2007 | Emery et al. | 455/569.1 |
| 2008/0274764 A1 * | 11/2008 | Masuda et al. | 455/550.1 |
| 2010/0066696 A1 * | 3/2010 | Yang et al. | 345/173 |

OTHER PUBLICATIONS

English translation of abstract of CN 101860377 A (published Oct. 13, 2010).

English translation of abstract of CN 102170305 A (published Aug. 31, 2011).

English translation of abstract of CN 101540621 A (published Sep. 23, 2009).

* cited by examiner

HANDHELD COMMUNICATION DEVICE AND COMMUNICATION METHOD OF THE SAME

BACKGROUND

1. Technical Field

The present application relates to a communication technology. More particularly, the present application relates to a handheld communication device and a communication method of the same.

2. Description of Related Art

Handheld electronic devices become indispensable in daily life of most of the people because of the advantages of small size, lightweight and portability. Recently, the handheld electronic devices can perform data transmission through wireless network in addition to the telephony communication. Accordingly, the design trend of the handheld electronic devices is related to wireless and high data transmission speed. The antenna is responsible for data transmission/receiving thus it becomes more and more important. Efficient data transmission can be achieved by using a well-designed antenna.

However, only the condition of free space is taken into consideration in the conventional handheld electronic device design process. When the handheld electronic device is operated in a hand mode, the hand and the head of the user may absorb part of the energy radiated from the antenna and affect the operation of the antenna. The performance of the antenna is degraded since the frequency band that the antenna operates in would shift to the lower ones due to the hand and the head of the user.

Accordingly, what is needed is a handheld communication device and a communication method of the same to overcome the above issues.

SUMMARY

An aspect of the present application is to provide a communication method used in a handheld communication device. The communication method comprises the steps outlined below. Whether a voice communication is established is determined. Whether the handheld communication device is operated in a hand mode is determined by activating a sensing element when the voice communication is established. When the handheld communication device is not operated in the hand mode, an antenna module of the handheld communication device is operated in a first operation frequency band to perform the voice communication. When the handheld communication device is operated in the hand mode, the antenna module of the handheld communication device is operated in a second operation frequency band to perform the voice communication, in which the second operation frequency band is higher than the first operation frequency band.

Another aspect of the present application is to provide a handheld communication device. The handheld communication device comprises a communication module, a sensing element and an antenna module. The communication module determines whether a voice communication is established. The sensing element is activated when the voice communication is established to determine whether the handheld communication device is operated in a hand mode. The antenna module is operated in a first operation frequency band to perform the voice communication when the handheld communication device is not operated in the hand mode and is operated in a second operation frequency band to perform the voice communication when the handheld communication device is operated in the hand mode, in which the second operation frequency band is higher than the first operation frequency band.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
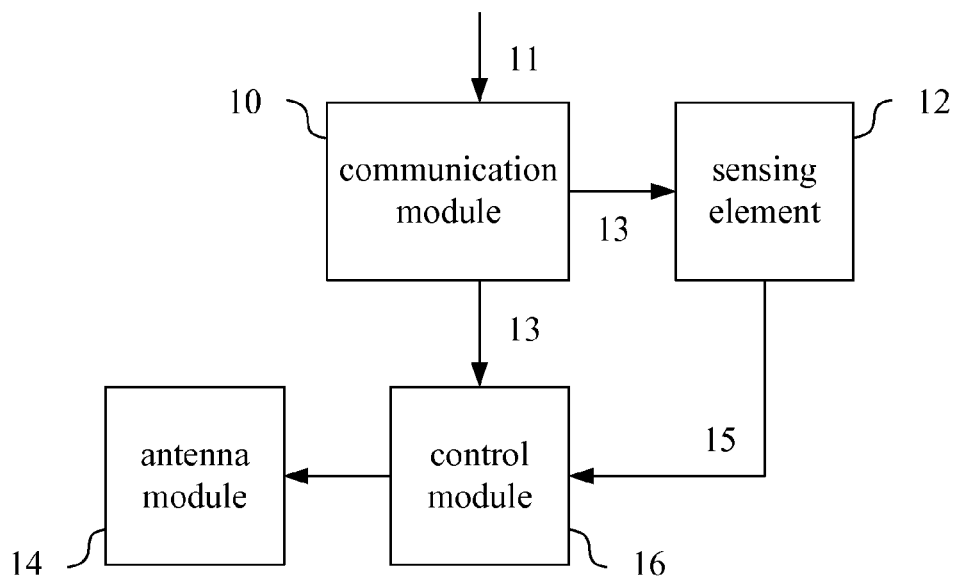
FIG. 1 is a block diagram of a handheld communication device in an embodiment of the present invention.

Reference will now be made in detail to the present embodiments of the application, examples of which are illustrated in the accompanying drawings. Wherever possible, the same reference numbers are used in the drawings and the description to refer to the same or like parts.

FIG. 1 is a block diagram of a handheld communication device 1 in an embodiment of the present invention. In different embodiments, the handheld communication device 1 can be a mobile phone, a smart phone, a tablet personal computer or other communication devices. The handheld communication device 1 at least comprises a communication module 10, a sensing element 12, an antenna module 14 and a control module 16.

The communication module 10 determines whether a voice communication 11 is established, whether a packet transmission is performed or whether a wireless communication is performed between the handheld communication device 1 and an external device, either another communication device or a base station (not shown). In an embodiment, the voice communication 11 is performed via the public switched telephone network (PSTN). In other words, the voice communication 11 can be performed via a common telephony network or a base station. In other embodiments, the voice communication 11 can be performed via the voice over Internet protocol (VoIP) service. In other words, the voice communication 11 can be performed via Internet by using software such as Skype. It is noted that the term "voice communication" can also be interpreted as an operation state of the communication module 10 after a communication event occurred.

After the communication module 10 determines that the voice communication 11 is established, the sensing element 12 is activated accordingly. In an embodiment, the communication module 10 can transmit a voice communication establishment signal 13 to activate the sensing element 12. The sensing element 12 determines whether the handheld communication device 1 is operated in a hand mode or a hand-free mode. In the present embodiment, the sensing element 12 is a proximity sensor to sense whether there is an object located near the sensing element 12. For example, the sensing element 12 can sense whether a user's head is located near the sensing element 12. When a distance between the user head position and the handheld communication device 1 is smaller than a specific distance, the sensing element 12 determines that the handheld communication device 1 is operated in the hand mode. On the contrary, when the user uses a speaker, a wired earphone or a Bluetooth wireless earphone to perform the voice communication 11 such that the distance between the user's head position and the handheld communication device 1 is larger than the specific distance, the sensing element 12 determines that the handheld communication device 1 is operated in the hand-free mode.

It is noted that when the voice communication 11 is performed via the PSTN service, the sensing element 12 can be directly activated to perform the sensing process. However, when software is used to perform the voice communication 11 via the VoIP service through the wireless network instead of the telephony network, an activating signal (not shown) can be sent by the corresponded software after the communication event occurred to activate the sensing element 12.

When the sensing element 12 determines that the handheld communication device 1 is not operated in the hand mode, the antenna module 14 is operated in a first operation frequency band to perform the voice communication or the wireless communication according to the control of the communication module 10 and other related elements (e.g. the processor) of the handheld communication device 1.

When the sensing element 12 determines that the handheld communication device 1 is operated in the hand mode, the antenna module 14 is set to be operated in a second operation frequency band to perform the voice communication or the wireless communication, in which a central operation frequency of the second operation frequency band is higher than a central operation frequency of the first operation frequency band. In an embodiment, the antenna module 14 is controlled and configured to be operated in different frequency bands by the control module 16 after the control module 16 receives a sensing signal 15 from the sensing element 12.

Figure 2:
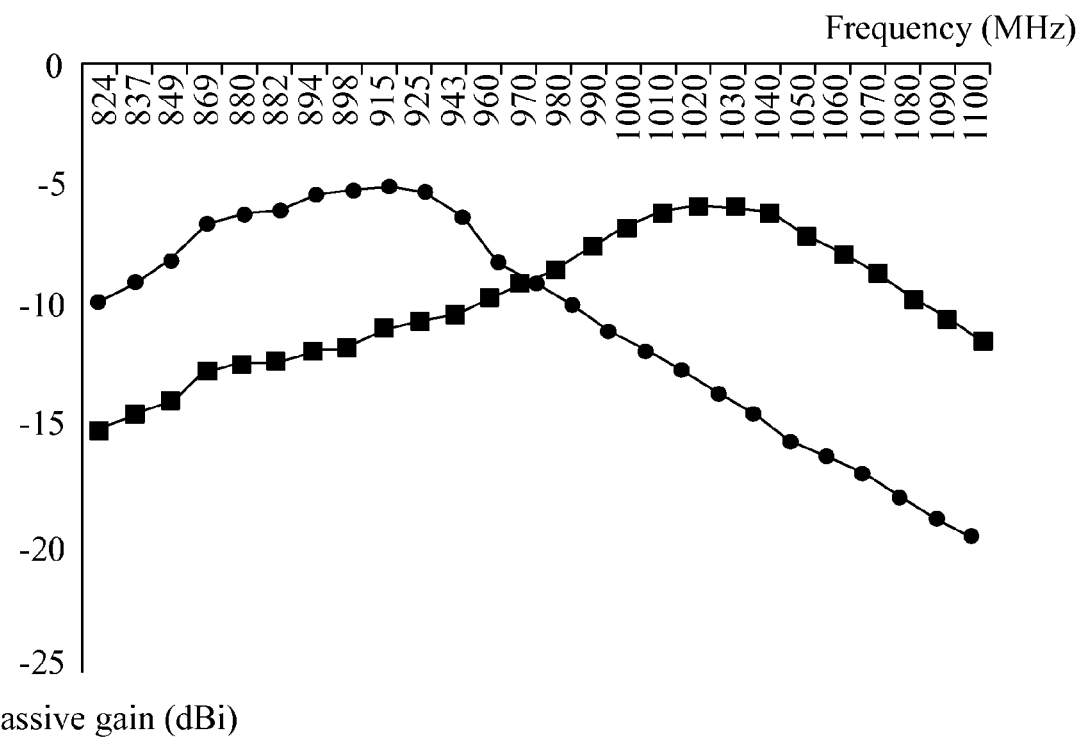
FIG. 2 is a diagram of the waveform of the operation frequency bands and the passive gain of the antenna module.

FIG. 2 is a diagram of the waveform of the operation frequency bands and the passive gain of the antenna module 14, in which the x-axis represents the operation frequency (MHz) and the y-axis represents the passive gain (dBi). The line formed by the round points in FIG. 2 corresponds to the measurement result of the operation state under the condition of free space, i.e. the non-hand mode. On the other hand, the line formed by the square points in FIG. 2 corresponds to the measurement result of the operation state under the condition of having a load near the handheld communication device 1, i.e. the hand mode or phantom mode. In a preferred embodiment, the first operation frequency band is within a range of 824 MHz-960 MHz and the second operation frequency band is within a range of 970-1100 MHz. However, in other embodiments, the range of the first and the second frequency bands can be dynamically adjusted according to different applications.

Consequently, when the sensing element 12 determines that the handheld communication device 1 is operated in the hand mode, the control module 16 can control the antenna module 14 such that the operation frequency band of the antenna module 14 switches from a lower frequency band to a higher frequency band immediately. As described above, the operation frequency band would shift from a higher range to a lower range when the user's head and hand absorb the energy radiated from the antenna module 14. Hence, the actual frequency band that the antenna module 14 is operated in during the hand mode is similar to the frequency band that the antenna module 14 is operated in under the free space condition. The degradation of the radiation efficiency of the antenna module 14 due to the absorption of the electromagnetic waves by the human body can be avoided.

Figure 3:
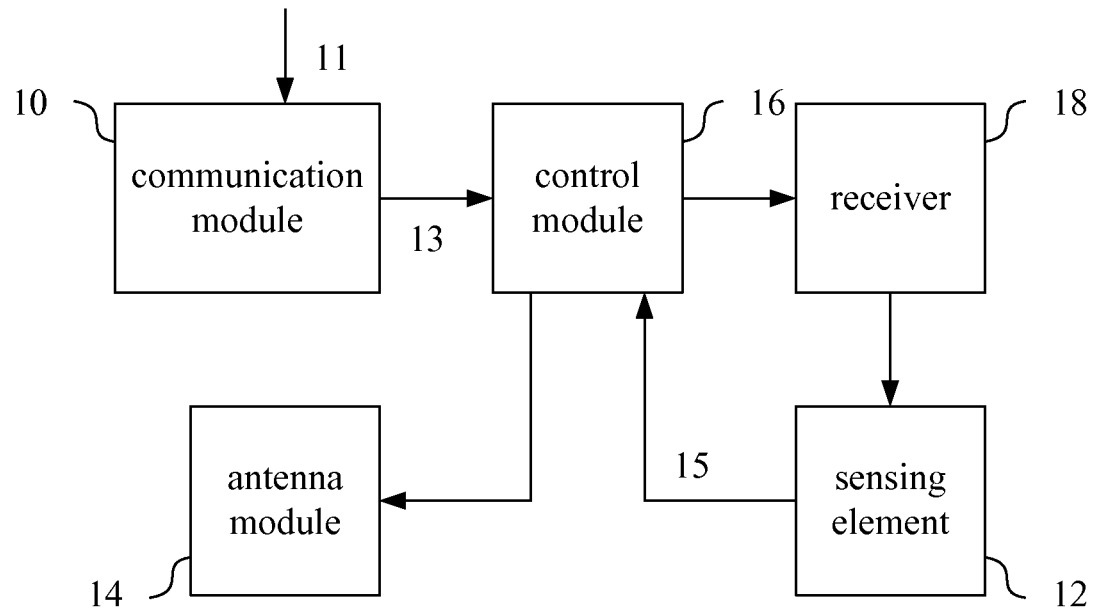
FIG. 3 is a block diagram of a handheld communication device in another embodiment of the present invention.

FIG. 3 is a block diagram of a handheld communication device 3 in another embodiment of the present invention. The elements of the handheld communication device 3 are similar to those of the handheld communication device 1. Nevertheless, the handheld communication device 3 further comprises a receiver 18.

In the present embodiment, the sensing element 12 is designed to sense whether the receiver 18 of the handheld communication device 3 is activated to determine whether the handheld communication device 3 is operated in the hand mode or in the non-hand mode. In an embodiment, after the communication module 10 determines that the voice communication 11 is established, the communication module 10 further transmits a voice communication establishment signal 13 or other kinds of signal to the control module 16 to notify the establishment of the voice communication 11. The control module 16 further determines whether the receiver 18 is activated according to a receiving mode.

When the receiving mode is a Bluetooth wireless receiving mode or an earphone receiving mode, the control module 16 does not activate the receiver 18. For example, the control module 16 can determine the receiving mode according to whether an earphone jack of the handheld communication device 3 is inserted by an earphone plug or whether a Bluetooth transmission module (not shown) is activated. When the receiving mode is a hand mode, the control module 16 activates the receiver 18 to perform the voice communication. Consequently, the sensing element 12 can sense whether the receiver 18 is activated to determine whether the handheld communication device 3 is operated in the hand mode. The sensing element 12 can perform the determination when the voice communication 11 is performed via either the PSTN service or the VoIP service.

Figure 4:
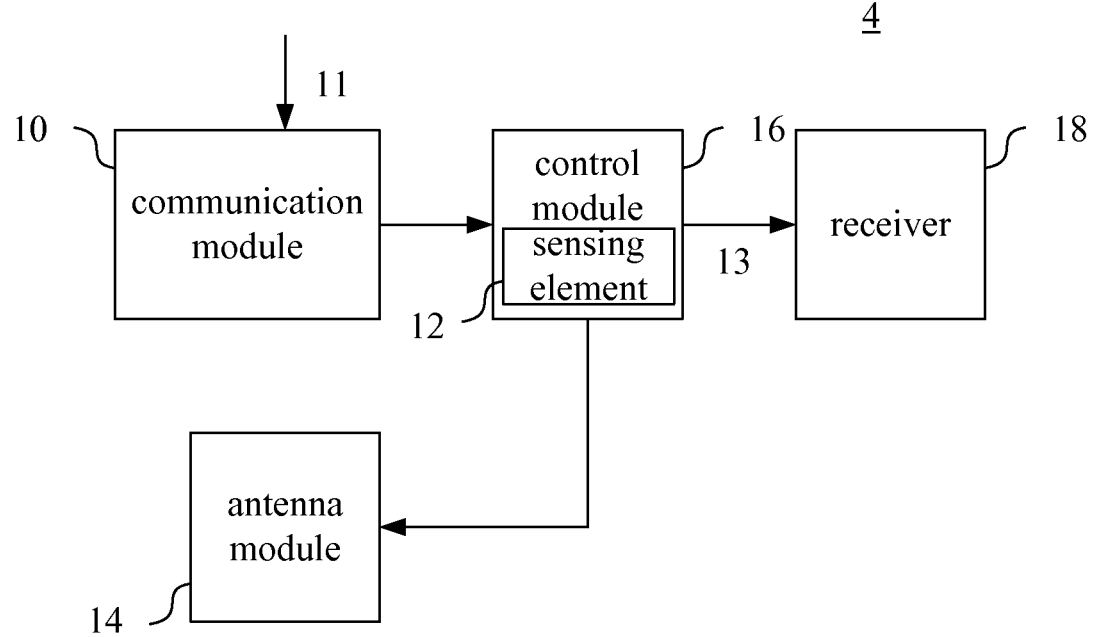
FIG. 4 is a block diagram of a handheld communication device in yet another embodiment of the present invention.

FIG. 4 is a block diagram of a handheld communication device 4 in yet another embodiment of the present invention. It is noted that in the present embodiment, the sensing element 12 depicted in FIG. 3 can be integrated into the control module 16 as shown in FIG. 4 to determine the operation of the hand mode of the handheld communication device 4 directly when the control module 16 activate the receiver 18 such that the control module 16 can directly adjust the antenna module 14 set in the second operation frequency band to perform the voice communication 11.

Figure 5:
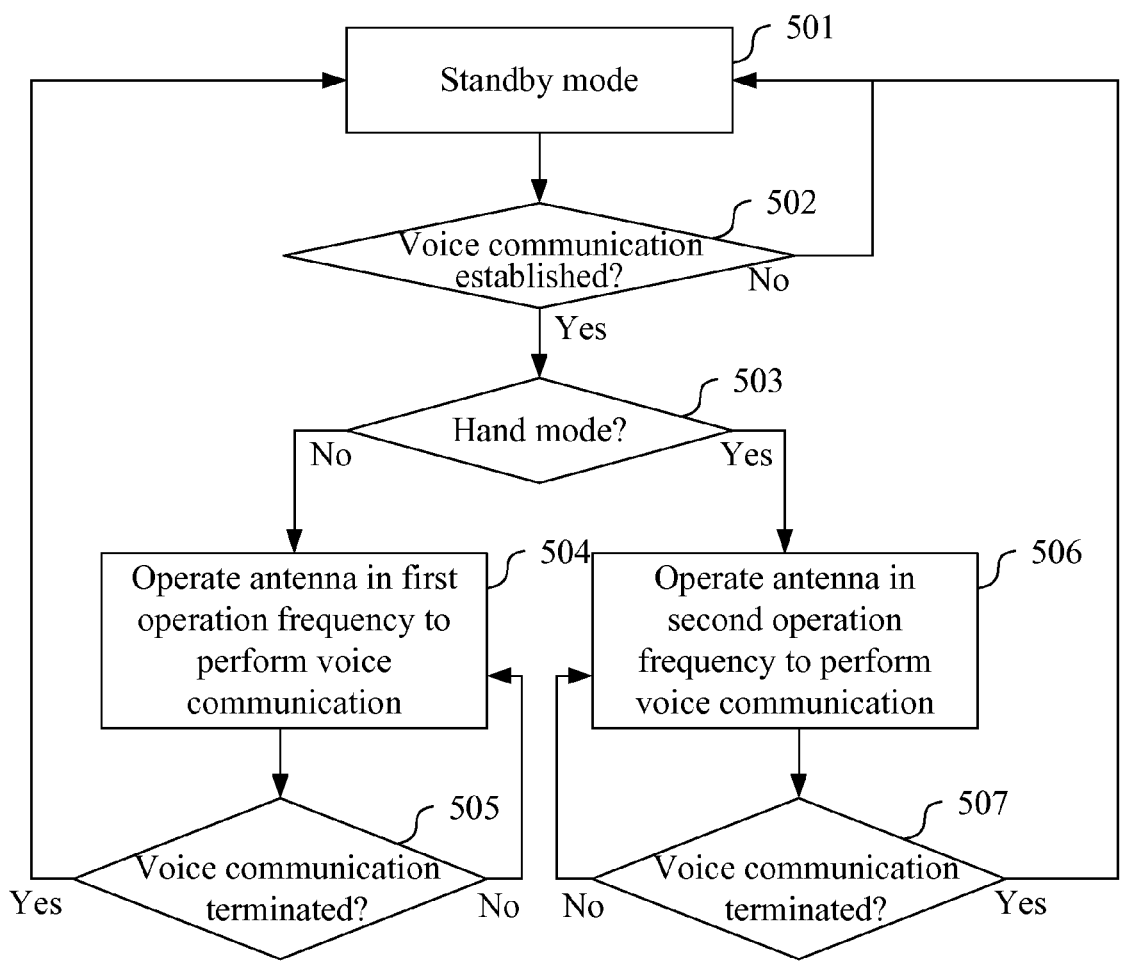
FIG. 5 is a flow chart of a communication method in an embodiment of the present invention.

FIG. 5 is a flow chart of a communication method 500 in an embodiment of the present invention. The communication method 500 can be used in the handheld communication device described in the above embodiments. However, the handheld communication device 1 depicted in FIG. 1 is used as the example to describe the communication method 500. The communication method 500 comprises the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 501, the handheld communication device 1 is operated in a standby mode.

In step 502, the communication module 10 determines whether a voice communication 11 of the handheld communication device 1 is established. When the voice communication 11 is not established, the flow goes back to step 501 such that the handheld communication device 1 is operated in the standby mode.

When the voice communication 11 is established, the sensing element 12 is activated in step 503 to determine whether the handheld communication device 1 is operated in a hand mode. As described above, the sensing element 12 can sense whether a user's head position is near to the handheld communication device 1 when the sensing element 12 is implemented by a proximity sensor, or can sense whether the receiver 18 is activated to determine whether the handheld communication device 1 is operated in the hand mode.

In step 504, when the handheld communication device 1 is not operated in the hand mode, the control module 16 controls the antenna module 14 of the handheld communication device 1 to be operated in a first operation frequency band to perform the voice communication 11.

In step 505, the communication module 10 further determines whether the voice communication 11 is terminated. When the voice communication 11 is not terminated, the flow goes back to step 504 such that the control module 16 keeps the antenna module 14 operating in the first operation frequency band. When the voice communication 11 is terminated, the control module 16 controls the handheld communication device 1 to be operated in the standby mode in step 501.

In step 506, when the handheld communication device 1 is operated in the hand mode, the control module 16 controls the antenna module 14 of the handheld communication device 1 to be operated in a second operation frequency band to perform the voice communication 11, in which the second operation frequency band is higher than the first operation frequency band.

In step 507, the communication module 10 further determines whether the voice communication 11 is terminated. When the voice communication 11 is not terminated, the flow goes back to step 506 such that the control module 16 keeps the antenna module 14 operating in the second operation frequency band. When the voice communication 11 is terminated, the control module 16 controls the handheld communication device 1 to be operated in the standby mode in step 501.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication method used in a handheld communication device comprising:
   determining whether a voice communication is established;
   determining whether the handheld communication device is operated in a hand mode by activating a sensing element when the voice communication is established; and
   wherein when the handheld communication device is not operated in the hand mode, an antenna module of the handheld communication device is operated in a first operation frequency band to perform the voice communication;
   when the handheld communication device is operated in the hand mode, the antenna module of the handheld communication device is operated in a second operation frequency band to perform the voice communication, in which the second operation frequency band is higher than the first operation frequency band.

2. The communication method of claim 1, wherein the sensing element is a proximity sensor to sense a user head position such that the handheld communication device is determined to be operated in the hand mode when a distance between the user head position and the handheld communication device is smaller than a specific distance.

3. The communication method of claim 1, wherein the sensing element detects whether a receiver of the handheld communication device is activated such that the handheld communication device is determined to be operated in the hand mode when the receiver is activated.

4. The communication method of claim 3, further comprising a step of determining whether the receiver is activated according to a receiving mode when the voice communication is established.

5. The communication method of claim 4, wherein the receiver is not activated when the receiving mode is a Bluetooth wireless receiving mode or an earphone receiving mode.

6. The communication method of claim 1, wherein the voice communication is a PSTN (public switched telephone network) voice communication.

7. The communication method of claim 1, wherein the voice communication is a VoIP (voice over IP) voice communication.

8. The communication method of claim 1, wherein the first operation frequency band is within a first range of 824 MHz-960 MHz and the second operation frequency band is within a second range of 970-1100 MHz.

9. The communication method of claim 1, further comprising a step of determining whether the voice communication terminates such that the handheld communication device is operated in a standby mode after the voice communication terminates.

10. A handheld communication device comprising:
    a communication module to determine whether a voice communication is established;
    a sensing element to be activated when the voice communication is established to determine whether the handheld communication device is operated in a hand mode; and
    an antenna module to be operated in a first operation frequency band to perform the voice communication when the handheld communication device is not operated in the hand mode and to be operated in a second operation frequency band to perform the voice communication when the handheld communication device is operated in the hand mode, in which the second operation frequency band is higher than the first operation frequency band.

11. The handheld communication device of claim 10, wherein the sensing element is a proximity sensor to sense a user head position such that the handheld communication device is determined to be operated in the hand mode when a distance between the user head position and the handheld communication device is smaller than a specific distance.

12. The handheld communication device of claim 10, further comprising a receiver, wherein the sensing element detects whether the receiver is activated such that the handheld communication device is determined to be operated in the hand mode when the receiver is activated.

13. The handheld communication device of claim 12, further comprising a control module to determine whether the receiver is activated according to a receiving mode when the voice communication is established.

14. The handheld communication device of claim 13, wherein the control module does not activate the receiver when the receiving mode is a Bluetooth wireless receiving mode or an earphone receiving mode.

\* \* \* \* \*